US012771133B2

(12) United States Patent
Zheng et al.

(10) Patent No.: US 12,771,133 B2
(45) Date of Patent: Oct. 20, 2026

(54) MULTISTAGE ENERGY UTILIZATION SYSTEM BASED ON ELECTRICITY-HEAT-HYDROGEN-METHANE COUPLING

(71) Applicant: South China University of Technology, Guangzhou (CN)

(72) Inventors: Jiehui Zheng, Guangzhou (CN); Jiongcheng Guo, Guangzhou (CN); Zhigang Li, Guangzhou (CN); Qinghua Wu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 357 days.

(21) Appl. No.: 18/407,103

(22) Filed: Jan. 8, 2024

(65) Prior Publication Data

US 2024/0146059 A1 May 2, 2024

(30) Foreign Application Priority Data

May 26, 2023 (CN) ......................... 202310606106.5

(51) Int. Cl.
*H02J 3/06* (2026.01)
*H02J 3/28* (2006.01)
(Continued)

(52) U.S. Cl.
CPC .................. *H02J 3/06* (2013.01); *H02J 3/28* (2013.01); *H02J 3/381* (2013.01); *H02J 3/46* (2013.01);
(Continued)

(58) Field of Classification Search
USPC .......................................................... 700/295
See application file for complete search history.

(56) References Cited

U.S. PATENT DOCUMENTS

2012/0091730 A1* 4/2012 Stuermer .................. C25B 1/04 290/1 R
2015/0121869 A1* 5/2015 McAlister ............... C25B 11/02 422/162
(Continued)

OTHER PUBLICATIONS

Nastasi et al. "Hydrogen to link heat and electricity in the transition towards future Smart Energy Systems", ScienceDirect, 2016, p. 5-22. (Year: 2016).*
(Continued)

*Primary Examiner* — Hien D Khuu

(57) ABSTRACT

A multistage energy utilization system based on electricity-heat-hydrogen-methane coupling is connected with a power grid, a heat-supply network and a gas-supply network. The system includes a renewable energy resource module, a hydrogen energy storage module, a heat storage module, a gas fired-boiler module, a methane reactor module and a carbon capture and storage (CCS) module. The renewable energy resource module is connected with the power grid and the hydrogen energy storage module. The hydrogen energy storage module is connected with the power grid, the heat-supply network and the methane reactor module. The methane reactor module is connected with the hydrogen energy storage module, the CCS module and the gas-supply network. The gas fired-boiler module is connected with the gas-supply network. The hydrogen energy storage module, the CCS module and the methane reactor module are integrated to improve energy utilization and consumption level of renewable energy resources.

5 Claims, 13 Drawing Sheets

(51) Int. Cl.
*H02J 3/38* (2006.01)
*H02J 3/46* (2006.01)
*H02J 15/50* (2026.01)
*H02J 101/24* (2026.01)
*H02J 101/28* (2026.01)
*H02J 103/30* (2026.01)

(52) U.S. Cl.
CPC ........... *H02J 15/50* (2026.01); *H02J 2101/24* (2026.01); *H02J 2101/28* (2026.01); *H02J 2103/30* (2026.01)

(56) References Cited

U.S. PATENT DOCUMENTS

| | | | | |
|---|---|---|---|---|
| 2015/0143806 | A1* | 5/2015 | Friesth | F03G 7/04 220/592.2 |
| 2015/0184532 | A1* | 7/2015 | McAlister | F01K 5/02 290/52 |
| 2016/0017800 | A1* | 1/2016 | Simpson | F01K 13/00 422/162 |
| 2016/0226088 | A1* | 8/2016 | Fulde | C01B 3/24 |
| 2016/0285266 | A1 | 9/2016 | Rudlinger | |
| 2023/0133079 | A1* | 5/2023 | Sharpe | B60L 50/75 320/109 |
| 2023/0296034 | A1* | 9/2023 | O'Donnell | B63H 11/00 |
| 2024/0101415 | A1* | 3/2024 | Hurtado Perez | C25B 1/04 |
| 2024/0150169 | A1* | 5/2024 | Cohn | C10J 3/00 |
| 2024/0158226 | A1* | 5/2024 | Nguyen | B01J 8/0015 |

OTHER PUBLICATIONS

WO_2017060704_A1 (Year: 2017).*
Fafari et al. "Assessment and optimization of an integrated wind power system for hydrogen and methane production", Science Direct, 2018, p. 693-703. (Year: 2018).*
CN_213425790_U (Year: 2021).*
CN_113398716_A (Year: 2021).*
CN_214380121_U (Year: 2021).*
Chen et al. "Flexibility improvement evaluation of hydrogen storage based on electricity-hydrogen coupled energy model", Science Direct, 2021, p. 371-383. (Year: 2021).*
CN_216698443_U (Year: 2022).*
CN_116988074_A (Year: 2023).*
KR_20230129072_A (Year: 2023).*
KR_20240153440_A (Year: 2024).*

* cited by examiner

MULTISTAGE ENERGY UTILIZATION SYSTEM BASED ON ELECTRICITY-HEAT-HYDROGEN-METHANE COUPLING

CROSS-REFERENCE TO RELATED APPLICATIONS

This application claims the benefit of priority from Chinese Patent Application No. 202310606106.5, filed on May 26, 2023. The content of the aforementioned application, including any intervening amendments thereto, is incorporated herein by reference in its entirety.

TECHNICAL FIELD

This application relates to comprehensive energy utilization, and more particularly to a multistage energy utilization system based on electricity-heat-hydrogen-methane coupling.

BACKGROUND

In recent years, the energy field has focused on reducing carbon emissions and energy consumption to alleviate the global warming, climate change and depletion of fossil fuels, where the development of renewable energy resources and the design of a carbon capture, utilization and storage (CCUS) strategy have received considerable attention. However, the renewable energy resources can not completely replace the conventional energy source because of the characteristics of intermittent and volatility. Therefore, it is necessary to develop the large-scale distributed energy storage (DES) to improve the consumption of renewable energy resources in the novel power system, so as to enhance the stability of the power system and the flexibility of the renewable energy resources. At present, the large-scale DES technologies are predominated by electrochemistry energy storage and physical energy storage, which both have the disadvantage of limited medium- and long-term storage capacity. As a novel large-scale DES technology, the hydrogen-based energy storage technology is characterized by high energy density, low operation and maintenance cost, zero pollution, and excellent long-term storage and cogeneration properties. Hydrogen and electricity are two main energy carriers of the hydrogen-based energy storage, where the hydrogen energy storage system can convert the electric energy into the pollution-free hydrogen energy to be stored. The stored hydrogen energy can also be converted into heat energy while being converted into electric energy, and can be combined with carbon dioxide captured by the CCUS technique to provide energy resources, such as methane and methanol, for the terminals.

The CCUS involves the capture of carbon dioxide from the stationary sources, the distribution of carbon dioxide and the utilization and storage of carbon dioxide. However, owing to the parasitic power loss of the CCUS (for carbon dioxide capture and compression), the system cost and necessary capital investment will inevitably rise, and additional power generating capacity is required.

The combination of the hydrogen energy storage and CCUS can effectively improve the economy of the CCUS, and can further reduce the carbon emissions. Therefore, the hydrogen energy can overcome the gap between the current fossil fuel economy and the carbon-free energy future and extend the life of fossil fuels.

SUMMARY

In order to overcome the disadvantages of the prior art, this application provides a multistage energy utilization system based on electricity-heat-hydrogen-methane coupling, which can effectively decrease the investment cost, reduce consumption of the fossil fuel and carbon emissions, and reduce a rate of abandoned wind and abandoned light.

In order to arrive at the above purpose, the following technical solutions are adopted.

The present disclosure provides a multistage energy utilization system based on electricity-heat-hydrogen-methane coupling, comprising:

a renewable energy resource module;
a hydrogen energy storage module;
a heat storage module;
a gas fired-boiler module;
a methane reactor module; and
a carbon capture and storage (CCS) module;

wherein the multistage energy utilization system is connected with a power grid, a heat supply network and a gas supply network;

the renewable energy resource module is connected with the power grid and the hydrogen energy storage module; the renewable energy resource module is configured to convert a renewable energy resource into electric energy to supply electricity to the power grid; and the hydrogen energy storage module is configured to convert excess electric energy into hydrogen energy and heat energy in the case of meeting a load demand of the power grid, and store the hydrogen energy;

the heat energy is configured to be input to the heat supply network; the hydrogen energy storage module is connected with the power grid, the heat supply network and the methane reactor module; the hydrogen energy stored in the hydrogen energy storage module is configured to be converted into electric energy and heat energy to be input to the power grid and the heat supply network respectively when required by the multistage energy utilization system, and is also configured to be input to the methane reactor module for synthesis of methane;

the methane reactor module is connected with the hydrogen energy storage module, the CCS module and the gas supply network; the CCS module is configured to capture and store carbon dioxide emitted from the gas fired-boiler module; the carbon dioxide stored in the CCS module and the hydrogen energy stored in the hydrogen energy storage module are configured to be input to the methane reactor module to react to produce the methane when the multistage energy utilization system needs, and the methane produced in the methane reactor module is configured to be input to the gas supply network;

the gas fired-boiler module is connected with the gas supply network, the heat supply network and the CCS module; the gas fired-boiler module is configured to burn the methane supplied from the gas supply network and output heat energy to the heat supply network and carbon dioxide to the CCS module; and the heat storage module is connected with the heat supply network, and is configured to store excess heat energy in the multistage energy utilization system, and output the heat energy according to a load demand of the heat supply network.

In an embodiment, the renewable energy resource module includes a wind power generation module and a photovoltaic power generation module;

the wind power generation module is configured to convert wind energy into electric energy and transmit the electric energy to the power grid; and the photovoltaic power generation module is configured to convert solar energy into electric energy and transmit the electric energy to the power grid.

In an embodiment, the hydrogen energy storage module includes an electrolyzer unit, a hydrogen storage unit and a fuel cell unit;

the electrolyzer unit is configured to consume excess electric energy by converting the excess electric energy into hydrogen energy and heat energy on the premise that the multistage energy utilization system meets the load demand of the power grid;

the hydrogen storage unit is configured to store the hydrogen energy generated by the electrolyzer unit; and a multi-state operation mode of the hydrogen storage unit satisfies the following constrain:

$$0 \le S_t^{hs} \le \xi_1^{hs} W^{hst} \rightarrow E_t^{el} = 1, E_t^{fc} = 0, \varepsilon_{3t}^{mr} = 0$$
$$\xi_1^{hs} W^{hst} < S_t^{hs} \le \xi_2^{hs} W^{hst} \rightarrow E_t^{el} \in \{0, 1\}, E_t^{fc} \in \{0, 1\}, \varepsilon_{3t}^{mr} = 0$$
$$\xi_2^{hs} W^{hst} < S_t^{hs} \le W^{hst} \rightarrow E_t^{el} \in \{0, 1\}, E_t^{fc} \in \{0, 1\}, \varepsilon_{3t}^{mr} = \{0, 1\}$$

where $$S_t^{hs}$$

represents a hydrogen storage capacity of the hydrogen storage unit at time t; $w^{hst}$ represents a rated hydrogen storage capacity of the hydrogen storage unit;

$$E_t^{el}, E_t^{fc}, \text{ and } \varepsilon_{3t}^{mr}$$

are binary variables;

$$E_t^{el}$$

represents an operation state of the electrolyzer unit, $$E_t^{fc}$$

represents an operation state of the fuel cell unit and $$\varepsilon_{3t}^{mr}$$

represents an operation state of the methane reactor module; 1 indicates a running state and 0 indicates a non-running state;

$$\xi_1^{hs} \text{ and } \xi_2^{hs}$$

respectively represents a hydrogen storage percentage of the hydrogen storage unit; when the hydrogen storage capacity of the hydrogen storage unit is within a range of $$[0, \xi_1^{hs}],$$

the electrolyzer unit needs to work to ensure that there is a predetermined amount of hydrogen energy stored in the hydrogen storage unit, and the fuel cell unit and the methane reactor module are out of operation to ensure an operation margin of the hydrogen energy storage module; when the hydrogen storage capacity is within a range of $$[\xi_1^{hs}, \xi_2^{hs}],$$

whether the electrolyzer unit and the fuel cell unit need to work is determined according to actual requirement of the multistage energy utilization system, and the methane reactor module does not work; when the hydrogen storage capacity of the hydrogen storage unit is within a range of $$[\xi_2^{hs}, 1],$$

whether the methane reactor module needs to work is determined according to the actual requirement of the multistage energy utilization system; and the fuel cell unit is configured to convert the hydrogen energy in the hydrogen storage unit into electric energy and heat energy and transmit the electric energy and heat energy to the power grid and the heat supply network respectively according to a load demand of the multistage energy utilization system; and on the basis of meeting the load demand of the multistage energy utilization system, the fuel cell unit is configured to transmit additional electric energy to the power grid to obtain on-line profit.

In an embodiment, the operation state of the methane reactor module includes a cold standby state, a hot standby state and a preparation state; the methane reactor module is configured to perform methane preparation in the preparation state, and is configured to undergo the cold standby state and the hot standby state before reaching the preparation state;

a multi-operation state model of the methane reactor module is represented as follows:

$$\sum_{i=1}^{3} \varepsilon_{it}^{mr} = 1, \forall t, i \in \{1, 2, 3\}$$

$$\begin{cases} \sum_{t=u}^{u+N_{mr}^{i,min}-1} I_{it}^{in} \le 1 \\ \sum_{t=u}^{u+N_{mr}^{i,min}-1} \left(I_{it}^{in} + I_{it}^{out}\right) \le 1 \end{cases}, \forall 1 \le u \le |T| + 1 - N_{mr}^{i,min}, i \in \{1, 2, 3\}$$

$$I_{1t}^{out} + I_{3t}^{out} = I_{2t}^{in}, I_{1t}^{in} + I_{3t}^{in} = I_{2t}^{out}, \forall t$$

$$I_{it}^{in} + I_{it}^{out} \le 1, \forall t, i \in \{1, 2, 3\}$$

-continued $$I_{it}^{in} - I_{it}^{out} = \varepsilon_{it}^{in} - \varepsilon_{t,t-1}^{out}, \forall t, i \in \{1, 2, 3\}$$

$$\varepsilon_{3t}^{mr} P_{mr}^{min} \leq P_{mr}(t) \leq \varepsilon_{3t}^{mr} P_{mr}^{max}$$

where i represents three operation states of the methane reactor module, where 1 represents the cold standby state, 2 represents the hot standby state, and 3 represents the preparation state;

$$N_{m,r}^{i,min}$$

represents a minimum duration of individual states of the methane reactor module;

$$\varepsilon_{3t}^{mr}$$

represents an operation state variable of the methane reactor module, where 1 represents the methane reactor module is in state i at time t, and 0 represents the methane reactor module is not the in state i at time t, $$I_{it}^{in}$$

and $$I_{it}^{out}$$

are operation state switching variables of the methane reactor module; if $$I_{it}^{in}$$

is 1, it indicates that the methane reactor module does not enter the state i at time t, and if $$I_{it}^{in}$$

is 0, it indicates that the methane reactor module does not enter the state i at time t; if $$I_{out}^{out}$$

is 1, it indicates that the methane reactor module leaves the state i at time t, and if $$P_{it}^{out}$$

is 0, it indicates that the methane reactor module does not leave the state i at time t;

$$P_{mr}^{min}$$

represents a minimum methane output power of the methane reactor module, and $$P_{mr}^{max}$$

represents a maximum methane output power of the methane reactor module; and T represents a total cycle time of the methane reactor module; t and u represent operation subtimes of the methane reactor module.

In an embodiment, the CCS module includes a carbon capture submodule and a carbon storage submodule;

the carbon capture submodule is arranged on a gas outlet of the gas fired-boiler module, and is configured to capture part of the carbon dioxide emitted from the gas fired-boiler module; and the carbon storage submodule is configured to store captured carbon dioxide.

Compared to the prior art, the present disclosure has the following beneficial effects.

(1) Based on characteristics of the electricity-heat-hydrogen-methane coupling, this application enables the flexible utilization of multistage energy resources, improves the energy utilization efficiency and decreases the total investment cost.

(2) Compared to other power-to-gas (P2G) technologies, the present disclosure considers the decoupling of operation of the electrolyzer unit and the methane reactor module, allowing for more flexible operation.

(3) The combination of hydrogen energy storage and carbon capture, utilization and storage (CCUS) technologies can effectively improve the economy of CCUS and further reduce the carbon emissions.

DETAILED DESCRIPTION OF EMBODIMENTS

The present disclosure will be further described below with reference to the embodiments.

Figure 1:
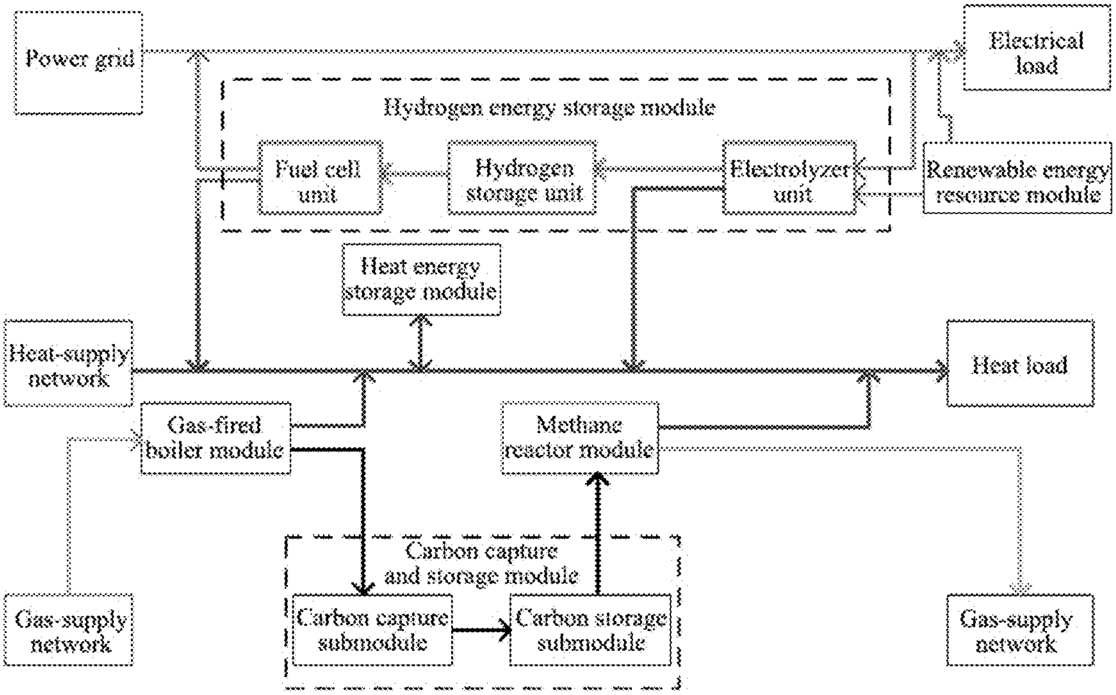
FIG. 1 schematically shows connection of modules of a multistage energy utilization system according to and embodiment of the present disclosure.

The present disclosure provides a multistage energy utilization system based on electricity-heat-hydrogen-methane coupling, which can be operated in an integrated energy park. The multistage energy utilization system is connected with a power grid, a heat supply network and a gas supply network. FIG. 1 schematically shows a relationship of modules of the multistage energy utilization system. The system includes a renewable energy resource module, a hydrogen energy storage module, a heat storage module, a gas fired-boiler module, a methane reactor module and a carbon capture and storage (CCS) module.

The renewable energy resource module is connected with the power grid and the hydrogen energy storage module. The renewable energy resource module is configured to convert a renewable energy resource into electric energy to supply electricity to the power grid. in the case of meeting a load demand of the power grid, the hydrogen energy storage module is configured to convert excess electric energy into hydrogen energy and heat energy and store the hydrogen energy.

The heat energy is input to the heat supply network. The hydrogen energy storage module is connected with the power grid, the heat supply network and the methane reactor. The hydrogen energy stored in the hydrogen energy storage module is configured to be converted to electric energy and heat energy to be input to the power grid and heat supply network respectively when required by the multistage energy utilization system needs, and is also configured to be input to the methane reactor module for synthesis of methane.

The methane reactor module is connected with the hydrogen energy storage module, the CCS module and the gas supply network. The CCS module is configured to capture and store carbon dioxide emitted from the gas fired-boiler module. The carbon dioxide stored in the CCS module and the hydrogen energy stored in the hydrogen energy storage module are configured to be input to the methane reactor module to react to produce the methane when the multistage energy utilization system needs, and the methane produced in the methane reactor module is configured to be input to the gas supply network.

The gas fired-boiler module is connected with the gas supply network, the heat supply network and the CCS module. The gas fired-boiler module is configured to burn the methane supplied from the gas supply network, and output heat energy to the heat supply network and emit carbon dioxide to the CCS module.

The heat storage module is connected with the heat supply network, and is configured to store excess heat energy in the multistage energy utilization system, and output the heat energy according to a load demand of the heat supply network.

In an embodiment, the renewable energy resource module includes a wind power generation module and a photovoltaic power generation module.

The wind power generation module is configured to convert wind energy into electric energy and transmit the electric energy to the power grid.

The photovoltaic power generation module is configured to convert solar energy into electric energy and transmit the electric energy to the power grid.

In an embodiment, the hydrogen energy storage module includes an electrolyzer unit, a hydrogen storage unit and a fuel cell unit.

The electrolyzer unit is configured to consume excess electric energy by converting the excess electric energy into hydrogen energy and heat energy on the premise that the multistage energy utilization system meets the load demand of the power grid.

The hydrogen storage unit is configured to store the hydrogen energy generated by the electrolyzer unit. And a multi-state operation mode of the hydrogen storage unit satisfies the following constrain:

$$0 \le S_t^{hs} \le \xi_1^{hs} W^{hst} \rightarrow E_t^{el} = 1,\ E_t^{fc} = 0,\ \varepsilon_{3t}^{mr} = 0$$

$$\xi_1^{hs} W^{hst} < S_t^{hs} \le \xi_2^{hs} W^{hst} \rightarrow E_t^{el} \in \{0, 1\},\ E_t^{fc} \in \{0, 1\},\ \varepsilon_{3t}^{mr} = 0$$

$$\xi_2^{hs} W^{hst} < S_t^{hs} \le W^{hst} \rightarrow E_t^{el} \in \{0, 1\},\ E_t^{fc} \in \{0, 1\},\ \varepsilon_{3t}^{mr} = \{0, 1\};$$

where $$S_t^{hs}$$

represents a hydrogen storage capacity of the hydrogen storage unit at time t; $w^{hst}$ represents a rated hydrogen storage capacity of the hydrogen storage unit;

$$E_t^{el},\ E_t^{fc},\ \text{and}\ \varepsilon_{3t}^{mr}$$

are binary variables, $$E_t^{el}$$

represents an operation state of the electrolyzer unit, $$E_t^{fc}$$

represents an operation state of the fuel cell unit and $$\varepsilon_{3t}^{mr}$$

represents an operation state of the methane reactor module; 1 indicates a running state, and 0 indicates a non-running state;

$$\xi_1^{hs} \text{ and } \xi_2^{hs}$$

respectively represents a hydrogen storage percentage of the hydrogen storage unit; when the hydrogen storage capacity of the hydrogen storage unit is within a range of $$[0, \xi_1^{hs}],$$

the electrolyzer unit needs to work to ensure that there is a predetermined amount of hydrogen energy stored in the hydrogen storage unit, and the fuel cell unit and the methane reactor module are out of operation to ensure an operation margin of the hydrogen energy storage module; when the hydrogen storage capacity of the hydrogen storage unit is within a range of $$[\xi_1^{hs}, \xi_2^{hs}],$$

whether the electrolyzer unit and the fuel cell unit need to work is determined to according to actual requirement of the multistage energy utilization system, and the methane reactor module does not work; when the hydrogen storage capacity of the hydrogen storage unit is within a range of $$[\xi_2^{hs}, 1],$$

whether the methane reactor module needs to work is determined according to the actual requirement of the multistage energy utilization system.

The fuel cell unit is configured to convert the hydrogen energy in the hydrogen storage unit into electric energy and heat energy and transmit the electric energy and heat energy to the power grid and the heat supply network respectively according to a load demand of the multistage energy utilization system. On the basis of meeting the load demand of the multistage energy utilization system, the fuel cell unit is configured to transmit additional electric energy to the power grid to obtain on-line profit.

In an embodiment, the operation state of the methane reactor module includes a cold standby state, a hot standby state and a preparation state; the methane reactor module is configured to perform methane preparation in the preparation state, and is configured to undergo the cold standby state and the hot standby state before reaching the preparation state.

A multi-operation state model of the methane reactor module is represented as follows:

$$\sum_{i=1}^{3} \varepsilon_{it}^{mr} = 1, \forall\, t, i \in \{1, 2, 3\}$$

$$\begin{cases} \sum_{t=u}^{u+N_{mr}^{i,min}-1} I_{it}^{in} \le 1 \\ \sum_{t=u}^{u+N_{mr}^{i,min}-1} \left(I_{it}^{in} + I_{it}^{out}\right) \le 1 \end{cases}, \forall\, 1 \le u \le |T| + 1 - N_{mr}^{i,min}, i \in \{1, 2, 3\}$$

$$I_{1t}^{out} + I_{3t}^{out} = I_{2t}^{in}, I_{1t}^{in} + I_{3t}^{in} = I_{2t}^{out}, \forall\, t$$

$$I_{it}^{in} + I_{it}^{out} \le 1, \forall\, t, i \in \{1, 2, 3\}$$

$$I_{it}^{in} - I_{it}^{out} = \varepsilon_{it}^{in} - \varepsilon_{t,t-1}^{out}, \forall\, t, i \in \{1, 2, 3\}$$

$$\varepsilon_{3t}^{mr} P_{mr}^{min} \le P_{mr}(t) \le \varepsilon_{3t}^{mr} P_{mr}^{max};$$

where i represents three operation states of the methane reactor module, where 1 represents the cold standby state, 2 represents the hot standby state, and 3 represents the preparation state;

$$N_{mr}^{i,min}$$

represents a minimum duration of individual states of the methane reactor module;

$$\varepsilon_{3t}^{mr}$$

represents an operation state variable of the methane reactor module, where 1 represents the methane reactor module is in state i at time t, and 0 represents the methane reactor module is not in the state i at time t, $$I_{it}^{in} \text{ and } I_{it}^{out}$$

are operation state switching variables of the methane reactor module, if $$I_{it}^{in}$$

is 1, it indicates that the methane reactor module enters the state i at time t, and if $$I_{it}^{in}$$

is 0, it indicates that the methane reactor module does not enter the state i at time t; if $$I_{it}^{out}$$

is 1, it indicates that the methane reactor module leaves the state i at time t, and if $$I_{it}^{out}$$

is 0, it indicates that the methane reactor module does not leave the state i at time t;

$$P_{mr}^{min}$$

represents a minimum methane output power of the methane reactor module, and $$P_{mr}^{max}$$

represents a maximum methane output power of the methane reactor module; and T represents a total cycle time of the methane reactor module; t and u represent operation subtimes of the methane reactor module. In an embodiment, the CCS module includes a carbon capture submodule and a carbon storage submodule.

The carbon capture submodule is arranged on a gas outlet of the gas fired-boiler module, and the carbon capture submodule is configured to capture part of the carbon dioxide emitted from the gas fired-boiler module.

The carbon storage submodule is configured to store the captured carbon dioxide.

Figure 2:
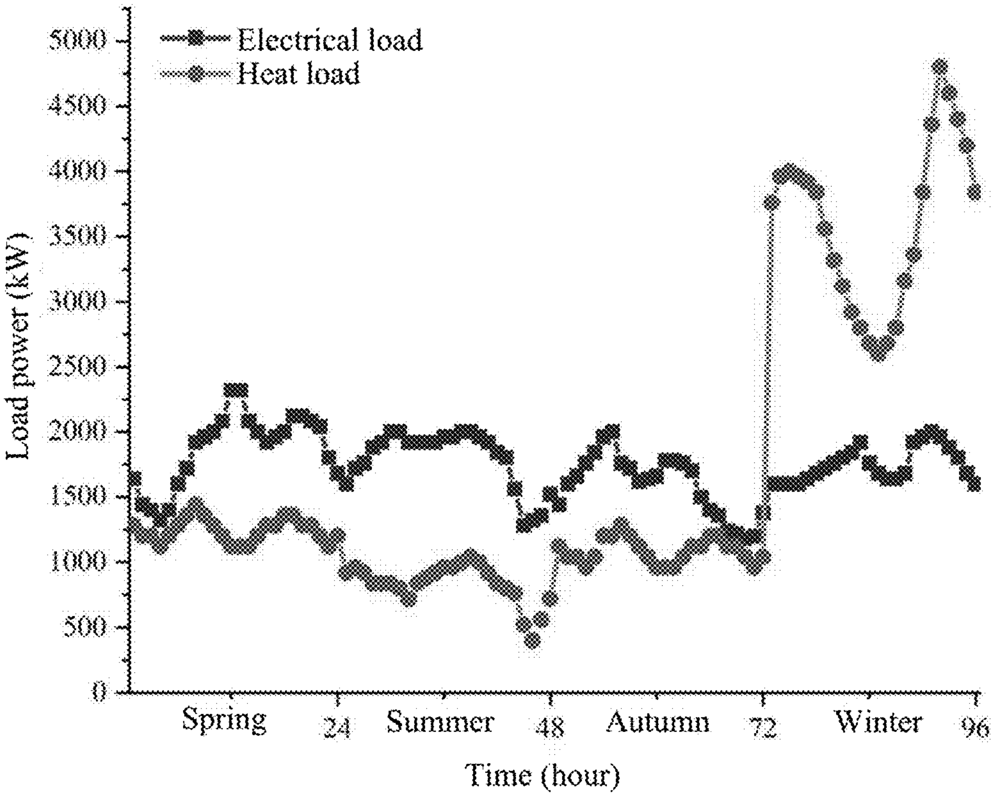
FIG. 2 shows a load demand curve in a park according to an embodiment of the present disclosure.
Figure 3:
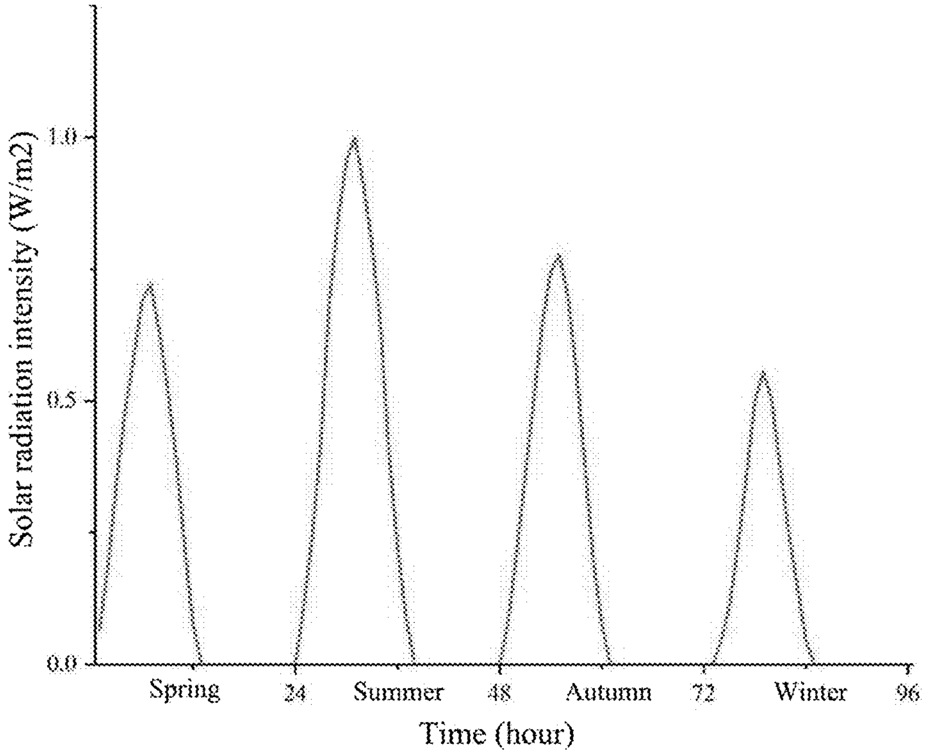
FIG. 3 shows a solar radiation intensity curve in the park according to an embodiment of the present disclosure.

Referring to FIGS. 2-3, in an embodiment, a park with high permeability of the renewable energy resource is provided as a simulation object to specifically illustrate the present disclosure. And advantages and effectiveness of the present disclosure are proved through an optimal capacity configuration of a multistage energy utilization system in the park. A data of electrothermal load and a solar radiation is mainly based on 4 typical days respectively in spring, summer, autumn and winter. A proportion of the electrothermal load is 66.43%, 46.38%, 68.34% and 206.0% respectively in the 4 seasons. In an embodiment, a carbon emission penalty price and a reward are 200¥/ton. A carbon emission coefficient of electric energy is 1.05 ton/MWh, and a carbon emission coefficient of natural gas is 0.65 ton/MWh. A price of the natural gas is 0.559¥/kWh, and the feed-in tariff is 0.5 times a purchase electricity price. A penalty of abandoned light is 0.2¥/kW. A load of abandoned electricity and abandoned light is 10 times a electricity price. A known infrastructure data of the multistage energy utilization system is required through an investigation or other means. Relevant parameters of the multistage energy utilization system are shown in Table 1.

TABLE 1

Parameter setting of park equipment

| Equipment | Investment cost per unit | Operating cost per unit | Maintenance cost per unit | Equipment efficiency |
|---|---|---|---|---|
| Photovoltaic equipment | 4500 ¥\kW | 0.039 ¥\kW | 2% $C_{inv}$ | — |
| Electrolyzer | 2210 ¥\kW | 0.03 ¥\kW | 3% $C_{inv}$ | 70% |
| Fuel cell | 4550 ¥\kW | 0.026 ¥\kW | 2% $C_{inv}$ | 70% |
| Gas-fired boiler | 782 ¥\kW | 0.026 ¥\kW | 4% $C_{inv}$ | 85% |
| Hydrogen storage tank | 65 ¥\Kg | 0.01 ¥\kWh | 1% $C_{inv}$ | 98% |
| Heat storage tank | 102 ¥\kWh | 0.026 ¥\kW | 2% $C_{inv}$ | 98% |
| Carbon storage tank | 1644 ¥\ton | 0.04 ¥\kW | 1% $C_{inv}$ | 98% |
| Methane reactor | 1500 ¥\kW | 0.027 ¥\kW | 2% $C_{inv}$ | 77% |
| Carbon capture device | 1851 ¥\(ton/h) | 0.026 ¥\kW | 4% $C_{inv}$ | 80% |
| Electric heating device | 1047 ¥\kW | 0.04 ¥\kW | 4% $C_{inv}$ | 90% |
| Electric energy storage | 640 ¥\kWh | 0.03 ¥\kW | 2% $C_{inv}$ | 98% |

In an embodiment, the multistage energy utilization system is compared with conventional energy storage and conventional hydrogen energy storage. Results of the capacity configuration are shown in Table 2. It shows that an installed capacity of the photovoltaic is the largest among the three units, indicating that the multistage energy utilization system has stronger capacity to assimilate the renewable energy resources. And the conventional energy storage unit needs to install a large-capacity electric heating device and a heat storage tank because it lacks of cogeneration ability.

TABLE 2

Comparison of optimal capacity configurations

| Equipment | Multistage energy utilization system | Conventional energy storage unit | Convention hydrogen energy storage unit |
|---|---|---|---|
| Photovoltaic equipment | 11.83 MW | 10.34 MW | 11.53 MW |
| Electrolyzer | 8.64 MW | — | 8.37 MW |
| Fuel cell | 1.76 MW | — | 1.82 MW |
| Gas-fired boiler | 2.80 MW | — | 2.81 MW |
| Hydrogen storage tank | 21.24 MW | — | 21.69 MWh |
| Heat storage tank | 13.55 MWh | 15.66 MWh | 12.48 MWh |
| Carbon storage tank | 2.03 ton | — | — |
| Methane reactor | 0.91 MW | — | — |
| Carbon capture device | 0.31 ton/h | — | — |
| Electric heating device | — | 10.21 MWh | — |
| Electric energy storage | — | 6.21 MWh | — |

In an embodiment, an energy consumption and a utilization efficiency are shown in Table 3. It can be seen that a ratio of the abandoned light and the energy consumption of the multistage energy utilization system are the lowest among the three units, and an energy utilization efficiency of the multistage energy utilization system are the highest among the three units, which can indicate that the multistage energy utilization system improve an energy utilization efficiency of the park.

TABLE 3

| Comparison of energy consumption and utilization efficiency | | | |
|---|---|---|---|
| Unit | Rate of abandoned light | Energy consumption | Energy utilization efficiency |
| Multistage energy utilization system | 0.84% | 161743.42 kWh | 89.71% |
| Conventional energy storage unit | 3.00% | 169365.41 kWh | 89.08% |
| Conventional hydrogen energy storage unit | 0.85% | 165330.96 kWh | 88.46% |

In an embodiment, details of an optimal cost configuration are shown in Table 4. In the table 4, though the multistage energy utilization system has the highest investment cost, it has the lowest operating cost among the three units, which is reflected in reducing the operating cost through the profit of the feed-in tariff and profit form methane. In carbon emissions, the multistage energy utilization system has the lowest carbon emission cost, which is reflected in that it reduces the energy consumption. In summary, the multistage energy utilization system can effectively reduce a total system cost, the energy consumption and the carbon emission cost, and increase the energy utilization efficiency.

TABLE 4

Comparison of optimal cost details

| | | Operating cost | | | | Carbon emission cost | | |
|---|---|---|---|---|---|---|---|---|
| Unit | Investment cost | Expenditure | Feed-in profit | Profit from methane | Maintenance cost | Expenditure | Reward | Total cost |
| Multistage energy utilization system | 6.38 | 10.94 | 0.29 | 0.77 | 1.96 | 2.41 | 0.18 | 20.45 |
| Conventional energy storage unit | 5.42 | 12.92 | 0.84 | — | 1.35 | 3.22 | — | 22.07 |
| Conventional hydrogen energy storage unit | 6.10 | 10.98 | 0.56 | — | 1.86 | 2.43 | — | 20.80 |

reactor, a change trend of the methane reactor is synchronized with the carbon capture device, and a capacity of the fuel cell is reduced to 0, realizing maximum methane benefit at a high natural gas price.

Mentioned above leads to an increase of the investment cost of the multistage energy utilization system and a first increase of the total cost and the operating cost. When the natural price is within a range of 0.8~1.3 ¥/kWh, the total cost and the operating cost of the multistage energy utilization system are finally reduced through selling methane at high price. With an increase of the natural price, the carbon emission cost is first reduced and then increased. When the natural price rises, more electric energy needs to be purchased from the power grid, resulting in higher carbon emission cost. In addition, when the natural gas price is within a range of 1.1~1.3 ¥/kWh, capacities of the electrolyzer, the carbon capture device, the gas-fired boiler, the photovoltaic and the methane reactor remain with the increase of the natural gas price, which can be seen in investment cost in FIG. 4*d* owing to be limited by a load demand of an electrical load and a heat load. When the natural gas price is higher than 0.3 ¥/kWh, the methane reactor and the carbon capture device participate in an operation of the multistage energy utilization system. The result shows that the multistage energy utilization system has a better performance under the condition of high natural gas price.

Figure 4A:
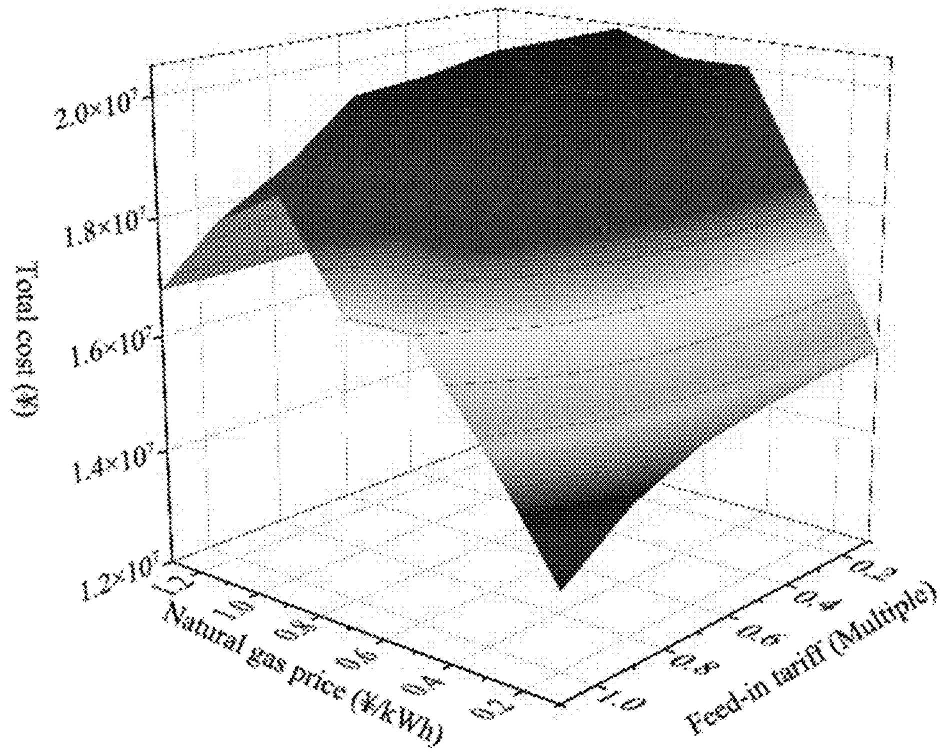
FIG. 4*a* shows a sensitivity analysis result of the total cost based on natural gas price and feed-in tariff according to an embodiment of the present disclosure.
Figure 4B:
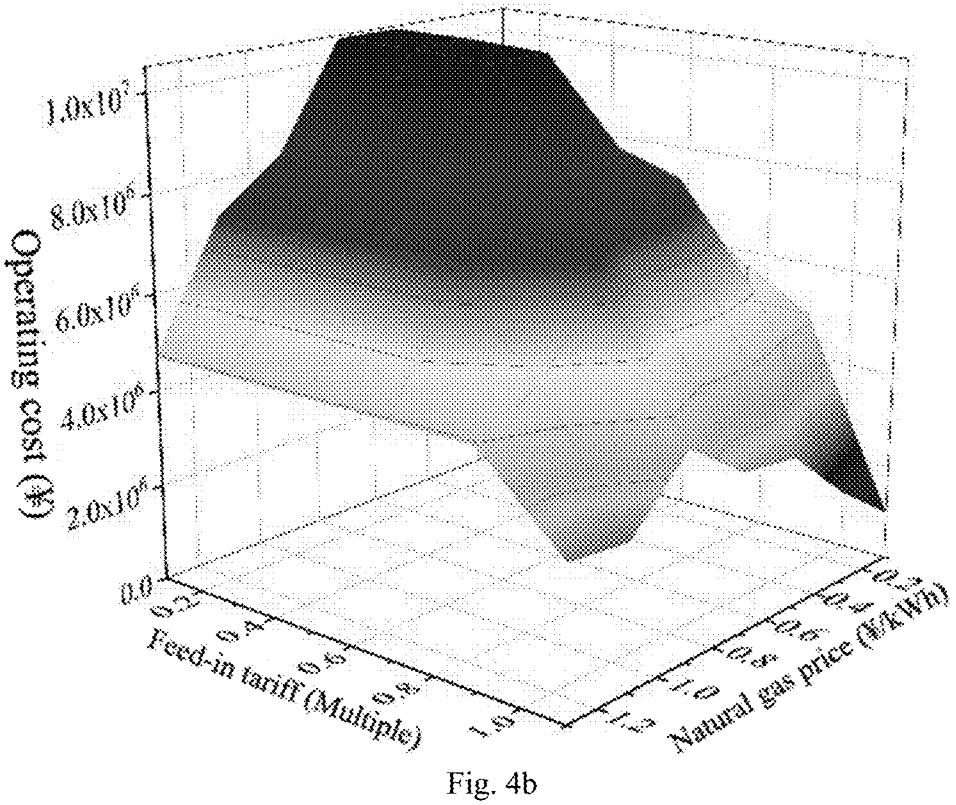
FIG. 4*b* shows a sensitivity analysis result of the operation cost based on natural gas price and feed-in tariff according to an embodiment of the present disclosure.
Figure 4C:
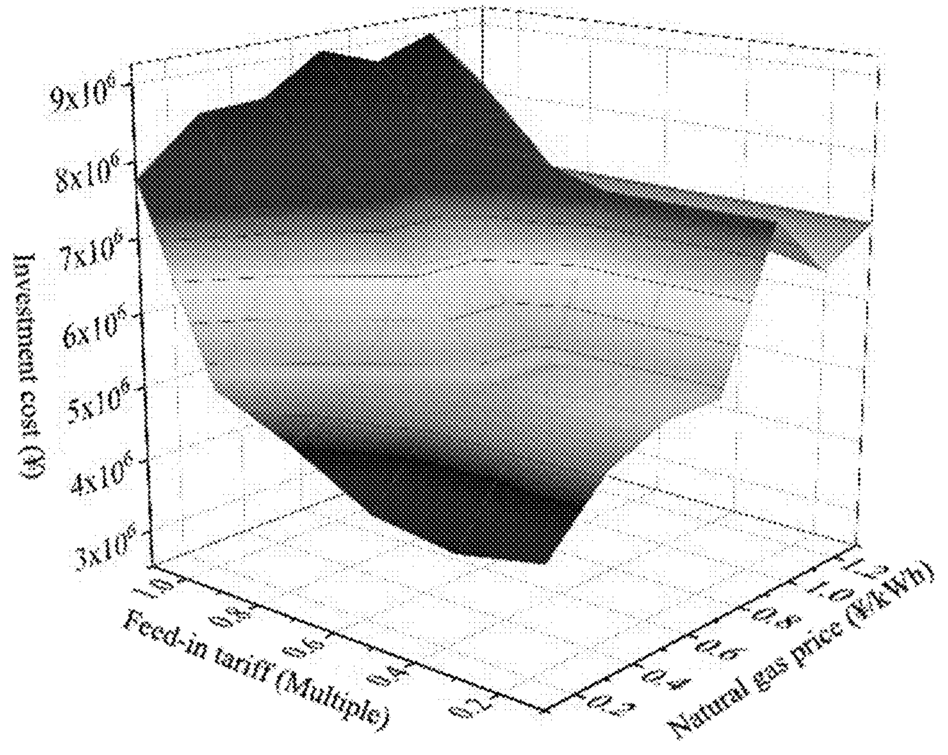
FIG. 4*c* shows a sensitivity analysis result of the investment cost based on natural gas price and feed-in tariff according to an embodiment of the present disclosure.
Figure 4D:
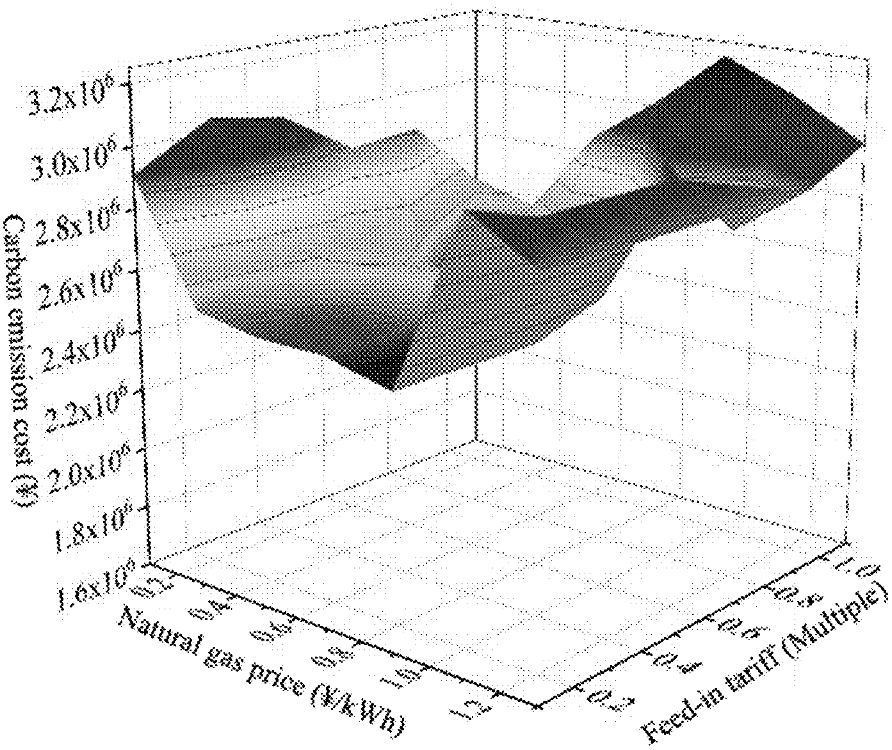
FIG. 4*d* shows a sensitivity analysis result of the carbon emission cost based on natural gas price and feed-in tariff according to an embodiment of the present disclosure.
Figure 5A:
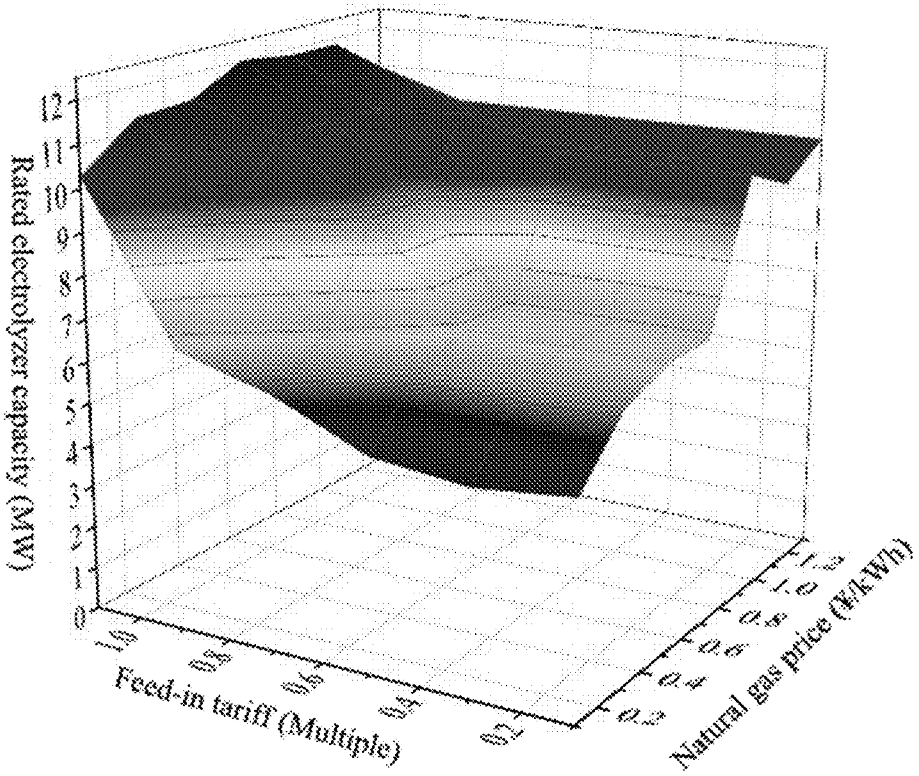
FIG. 5*a* shows a sensitivity analysis result of rated capacities of the electrolyzer in the multistage energy utilization system based on the natural gas price and feed-in tariff according to an embodiment of the present disclosure.
Figure 5B:
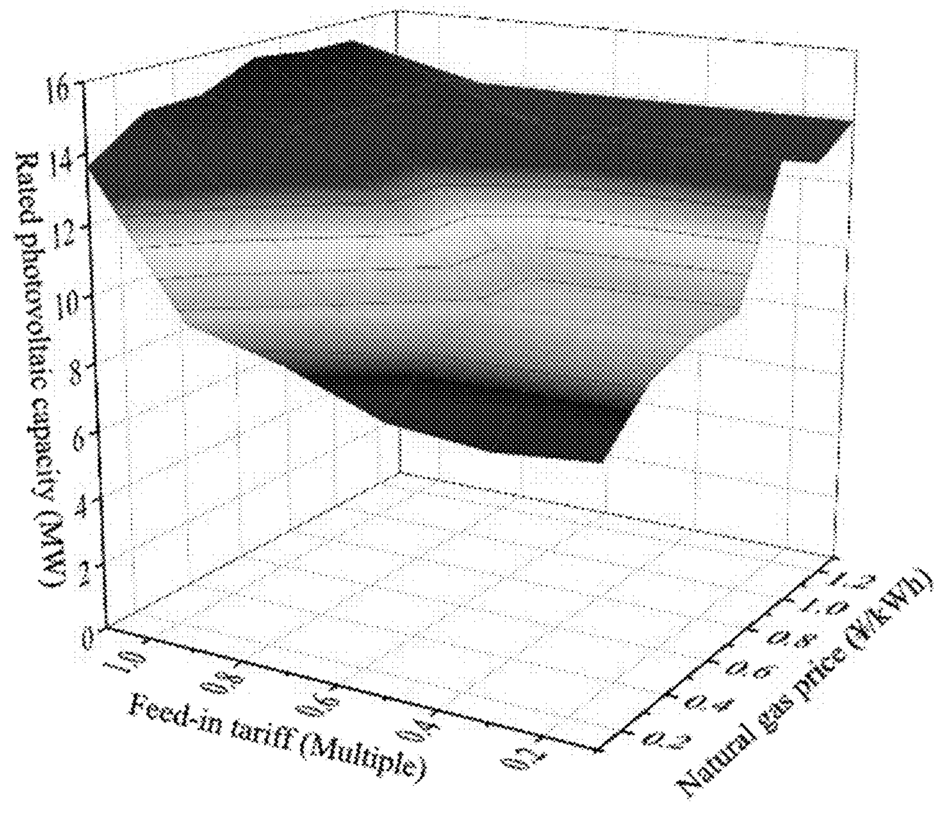
FIG. 5*b* shows a sensitivity analysis result of rated capacities of the photovoltaic in the multistage energy utilization system based on the natural gas price and feed-in tariff according to an embodiment of the present disclosure.
Figure 5C:
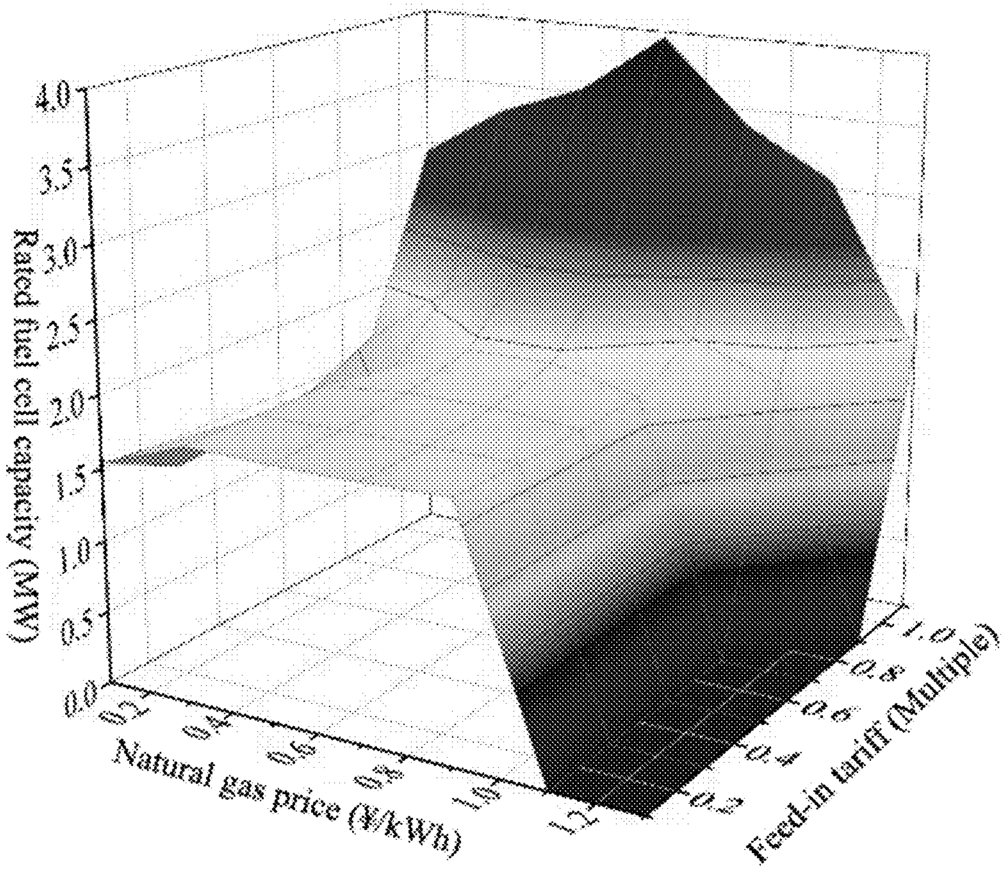
FIG. 5*c* shows a sensitivity analysis result of rated capacities of the fuel cell in the multistage energy utilization system based on the natural gas price and feed-in tariff according to an embodiment of the present disclosure.
Figure 5D:
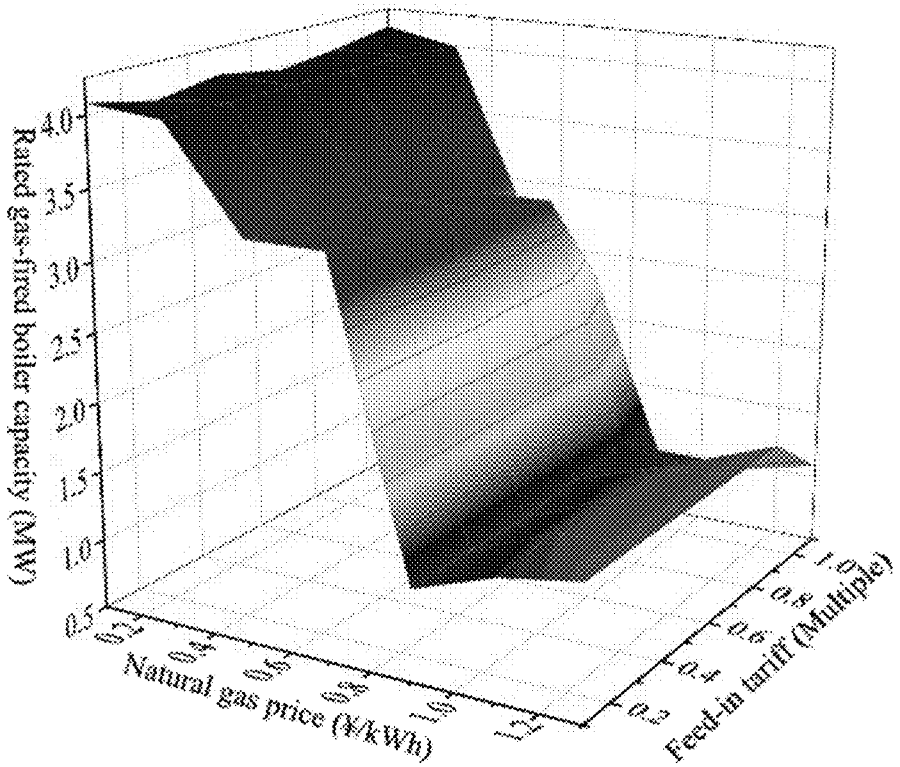
FIG. 5*d* shows a sensitivity analysis result of rated capacities of the gas-fired boiler in the multistage energy utilization system based on the natural gas price and feed-in tariff according to an embodiment of the present disclosure.
Figure 5E:
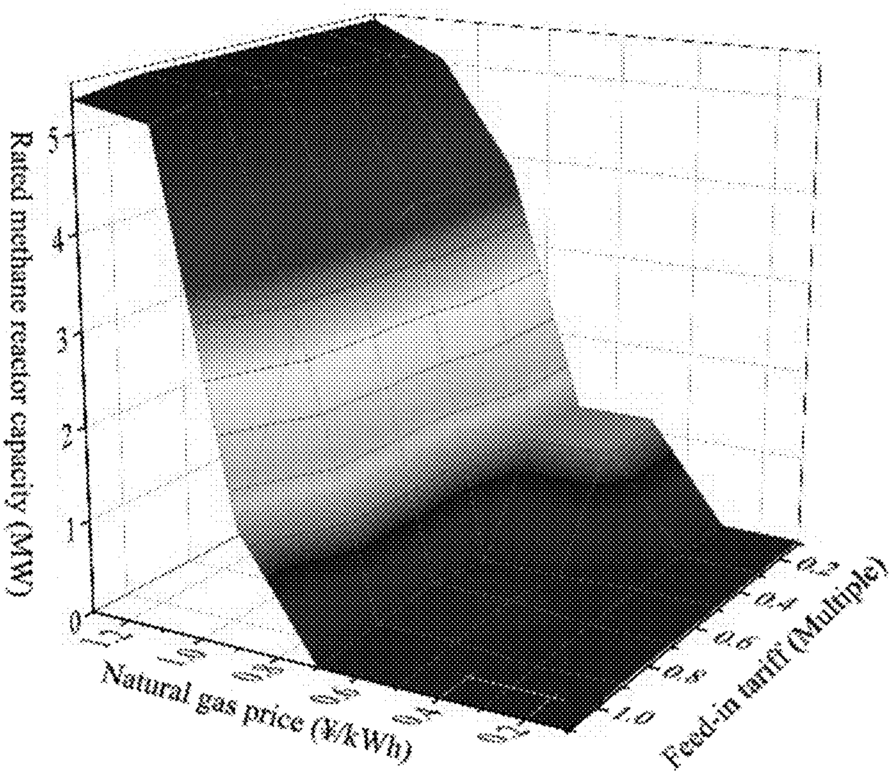
FIG. 5*e* shows a sensitivity analysis result of rated capacities of the methane reactor in the multistage energy utilization system based on the natural gas price and feed-in tariff according to an embodiment of the present disclosure.
Figure 5F:
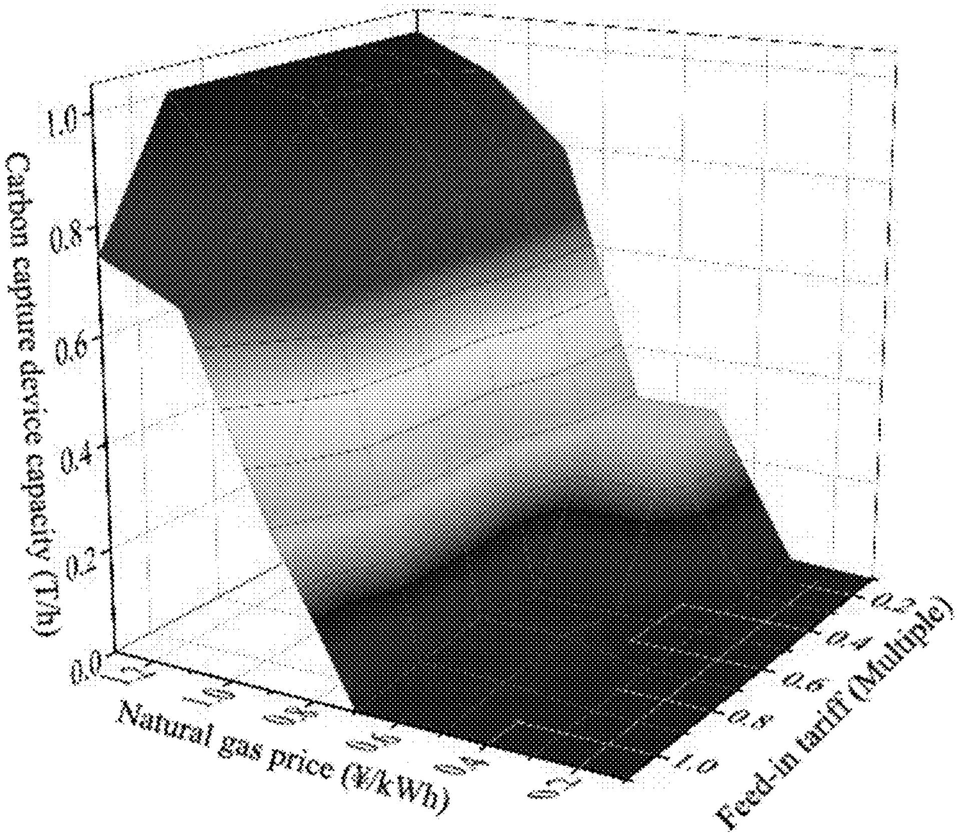
FIG. 5*f* shows a sensitivity analysis result of rated capacities of the carbon capture device in the multistage energy utilization system based on the natural gas price and feed-in tariff according to an embodiment of the present disclosure.

After comparatively analyzing the multi-stage energy utilization system, the natural gas price and the feed-in tariff of the multistage energy utilization system are analyzed. A sensitivity analysis of natural gas price and feed-in tariff to a system cost and an equipment capacity of the multistage energy utilization system is shown in FIGS. 4*a-d* and 5*a-f*. It can be seen that a change trend of the investment cost is synchronized with a change of a capacity of the electrolyzer and photovoltaic. Referring to FIGS. 4*a* and *b*, with increase of the natural gas price, the total cost and operating cost first increase and then decrease. As the natural gas price rises, the multistage energy utilization system can sell methane at a higher price and gain more profits. Therefore, capacities of the electrolyzer, the methane reactor, the carbon capture device and the photovoltaic are increased, and a capacity of the gas-fired boiler is decreased, so as to obtain a more efficient effect as shown in FIGS. 5*a-f*. Owing to a joint operation of the carbon capture device and the methane In terms of feed-in tariff, it can be observed from FIGS. 4*a-d* that with an increase of the feed-in tariff, the total cost and the operating cost of the multistage energy utilization system are reduced, and the investment cost are increased. Referring to FIGS. 5*a-f*, with an increase of the feed-in tariff, rated capacities of the electrolyzer, the photovoltaic and the fuel is increased, so as to sell more on-grid energy to obtain higher profit. Therefore, the investment cost of the multistage energy utilization system is increased, the operating cost and the total cost are reduced. With an increase of the feed-in tariff, a capacity of the gas-fired boiler remains unchanged, indicating that the capacity of the gas-fired boiler is mainly affected by the natural gas price. If the natural gas price is not within the range 1.1~1.3 ¥/kWh, a capacity of the methane reactor and the carbon capture device is decreased with an increase of the feed-in tariff.

In general, when the gas price is within a range 0.5~0.9¥/kWh and the feed-in tariff is 0.1~0.5 times of the time-of-use electricity price, the total cost and the operating cost of the multistage energy utilization system are in a peak range. When the gas price is within a range 0.5~0.7 ¥/kWh and the feed-in tariff is 0.7~0.9 times, the carbon emission cost is in a trough range.

Described above are only preferred embodiments of this application, and are not intended to limit the scope of this application. It should be noted that various modifications, replacements and variations made by those skilled in the art without departing from the spirit and principle of this application shall fall within the scope of this application defined by the appended claims.

What is claimed is:

1. A multistage energy utilization system based on electricity-heat-hydrogen-methane coupling, comprising:

a renewable energy resource;

a hydrogen energy storage;

a heat storage;

a gas fired-boiler;

a methane reactor; and a carbon capture and storage (CCS);

wherein the multistage energy utilization system connects with a power grid, a heat supply network and a gas supply network;

the renewable energy resource connects with the power grid and the hydrogen energy storage; the renewable energy resource converts a renewable energy into electric energy to supply electricity to the power grid; and the hydrogen energy storage converts excess electric energy into hydrogen energy and heat energy in the case of meeting a load demand of the power grid, and store the hydrogen energy;

the heat energy is input to the heat supply network; the hydrogen energy storage connects with the power grid, the heat supply network and the methane reactor;

the hydrogen energy stored in the hydrogen energy storage is converted back into the electric energy and the heat energy to input to the power grid and the heat supply network, respectively, when required by the multistage energy utilization system, and the electric energy and the heat energy are also input to the methane reactor for synthesis of methane;

the methane reactor connects with the hydrogen energy storage, the CCS and the gas supply network;

the CCS captures and stores carbon dioxide emitted from the gas fired-boiler;

the carbon dioxide stored in the CCS and the hydrogen energy stored in the hydrogen energy storage are input to the methane reactor to produce the methane when the multistage energy utilization system needs, and the methane produced in the methane reactor is input to the gas supply network;

the gas fired-boiler connects with the gas supply network, the heat supply network and the CCS; the gas fired-boiler burns the methane supplied from the gas supply network, and output heat energy to the heat supply network and emit carbon dioxide to the CCS; and the heat storage connects with the heat supply network to store excess heat energy in the multistage energy utilization system, and output the excess heat energy according to a load demand of the heat supply network.

2. The multistage energy utilization system of claim 1, wherein the renewable energy resource comprises a wind power generation and a photovoltaic power generation module;

the wind power generation the converts wind energy into electric energy and transmit the electric energy to the power grid; and the photovoltaic power generation converts solar energy into electric energy and transmit the electric energy to the power grid.

3. The multistage energy utilization system of claim 1, wherein the hydrogen energy storage comprises an electrolyzer, a hydrogen storage and a fuel cell;

the electrolyzer consumes excess electric energy by converting the excess electric energy into hydrogen energy and heat energy on the premise that the multistage energy utilization system meets the load demand of the power grid;

the hydrogen storage stores the hydrogen energy generated by the electrolyzer; and a multi-state operation mode of the hydrogen storage satisfies the following constraint:

$$0 \le S_t^{hs} \le \xi_1^{hs} W^{hst} \rightarrow E_t^{el} = 1,\ E_t^{fc} = 0,\ \varepsilon_{3t}^{mr} = 0$$

$$\xi_1^{hs} W^{hst} < S_t^{hs} \le \xi_1^{hs} W^{hst} \rightarrow E_t^{el} \in \{0,1\},\ E_t^{fc} \in \{0,1\},\ \varepsilon_{3t}^{mr} = 0$$

$$\xi_2^{hs} W^{hst} < S_t^{hs} \le W^{hst} \rightarrow E_t^{el} \in \{0,1\},\ E_t^{fc} \in \{0,1\},\ \varepsilon_{3t}^{mr} = \{0,1\};$$

wherein $$S_t^{hs}$$

represents a hydrogen storage capacity of the hydrogen storage at time t; $W^{hat}$ represents a rated hydrogen storage capacity of the hydrogen storage;

$$E_t^{el},\ E_t^{fc},\ \text{and}\ \varepsilon_{3t}^{mr}$$

are binary variables;

$$E_t^{el}$$

represents an operation state of the electrolyzer, $$E_t^{fc}$$

represents an operation state of the fuel cell and $$\varepsilon_{3t}^{mr}$$

represents an operation state of the methane reactor; 1 indicates a running state and 0 indicates a non-running state;

$$\xi_1^{hs}\ \text{and}\ \xi_2^{hs}$$

represents a hydrogen storage percentage of the hydrogen storage; when the hydrogen storage capacity of the hydrogen storage is within a range of $$[0, \xi_1^{hs}],$$

the electrolyzer needs to work to ensure that there is a predetermined amount of hydrogen energy stored in the hydrogen storage, and the fuel cell and the methane reactor are out of operation to ensure an operation margin of the hydrogen energy storage; when the hydrogen storage capacity of the hydrogen storage is within a range of $$[\xi_1^{hs}, \xi_2^{hs}],$$

whether the electrolyzer and the fuel cell need to work is determined according to actual requirement of the multi-stage energy utilization system, and the methane reactor does not work; when the hydrogen storage capacity of the hydrogen storage is within a range of $$[\xi_2^{hs}, 1],$$

whether the methane reactor needs to work is determined according to the actual requirement of the multistage energy utilization system; and the fuel cell converts the hydrogen energy in the hydrogen storage into electric energy and heat energy and transmit the electric energy and heat energy to the power grid and the heat supply network, respectively, according to a load demand of the multistage energy utilization system; and on the basis of meeting the load demand of the multistage energy utilization system, the fuel cell transmits additional electric energy to the power grid to obtain on-line profit.

4. The multistage energy utilization system of claim 1, wherein an operation state of the methane reactor comprises a cold standby state, a hot standby state and a preparation state; the methane reactor performs methane preparation in the preparation state, and undergoes the cold standby state and the hot standby state before reaching the preparation state;

a multi-operation state model of the methane reactor is represented as follows:

$$\sum_{i=1}^{3} \varepsilon_{it}^{mir} = 1, \forall t, i \in \{1, 2, 3\}$$

$$\begin{cases} \sum_{t=u}^{u+N_{mr}^{i,min}-1} I_{it}^{in} \le 1 \\ \sum_{t=u}^{u+N_{mr}^{i,min}-1} \left(I_{it}^{in} + I_{it}^{out}\right) \le 1 \end{cases}, \quad \forall\, 1 \le u \le |T| + 1 - N_{mr}^{i,min}, i \in \{1, 2, 3\}$$

$$I_{1t}^{out} + I_{3t}^{out} = I_{2t}^{in}, I_{1t}^{in} + I_{3t}^{in} = I_{2t}^{out}, \forall t$$

$$I_{it}^{in} + I_{it}^{out} \le 1, \forall t, i \in \{1, 2, 3\}$$

-continued $$I_{it}^{in} - I_{it}^{out} = \varepsilon_{it}^{in} - \varepsilon_{t,t-1}^{out}, \forall t, i \in \{1, 2, 3\}$$

$$\varepsilon_{3t}^{mr} P_{mr}^{min} \le P_{mr}(t) \le \varepsilon_{3t}^{mr} P_{mr}^{max};$$

wherein i represents three operation states of the methane reactor, wherein 1 represents the cold standby state, 2 represents the hot standby state, and 3 represents the preparation state;

$$N_{mr}^{i,min}$$

represents a minimum duration of individual sates of the methane reactor $$\varepsilon_{3t}^{mr}$$

represents an operation state of variable of the methane reactor, wherein 1 represents the methane reactor is in state i at time t, and 0 represents the methane reactor is not in the state i at time t;

$$I_{it}^{in} \text{ and } I_{it}^{out}$$

are operation state switching variables of the methane reactor $$I_{it}^{in}$$

is 1, it indicates that the methane reactor enters the state i at time t, and if $$I_{it}^{in}$$

is 0, it indicates that the methane reactor does not enter the state i at time t; if $$I_{it}^{out}$$

is 1, it indicates that the methane reactor leaves the state i at time t, and if $$I_{it}^{out}$$

is 0, it indicates that the methane reactor does not leave the state i at time t;

$$P_{mr}^{min}$$

represents a minimum methane output power of the methane reactor, and $$P_{mr}^{max}$$

represents a maximum methane output power of the methane reactor; and T represents a total cycle time of the methane reactor; t and u represent operation sub-times of the methane reactor.

5. The multistage energy utilization system of claim 1, wherein the CCS comprises a carbon capture submodule and a carbon storage submodule;

the carbon capture submodule is arranged on a gas outlet of the gas fired-boiler to capture part of the carbon dioxide emitted from the gas fired-boiler; and the carbon storage submodule stores the captured carbon dioxide.

* * * * *